Aug. 2, 1932.  P. W. CLARK  1,869,464

CONFECTION

Filed April 14, 1932

Inventor.
P. W. Clark.
By Hazard and Miller
Attorneys.

Patented Aug. 2, 1932

1,869,464

UNITED STATES PATENT OFFICE

PAUL WESLEY CLARK, OF LOS ANGELES, CALIFORNIA

CONFECTION

Application filed April 14, 1932. Serial No. 605,225.

This invention relates to improvements in confections.

An object of the invention is to provide an improved confection consisting primarily of top and bottom wafers spaced apart by a filling composed of two edible substances. I prefer to have one of these substances in the form of an annular ring within which the other substance is disposed. The purpose of such a construction is to have the ring of a more elastic substance than the center filling so that the ring acts somewhat as a dam or closure, preventing the center substance from being squeezed out from between the wafers while the confection is being eaten.

With the foregoing and other objects in view, which will be made manifest in the following detailed description, and specifically pointed out in the appended claims, reference is had to the accompanying drawing for an illustrative embodiment of the invention, wherein:

Figure 1:
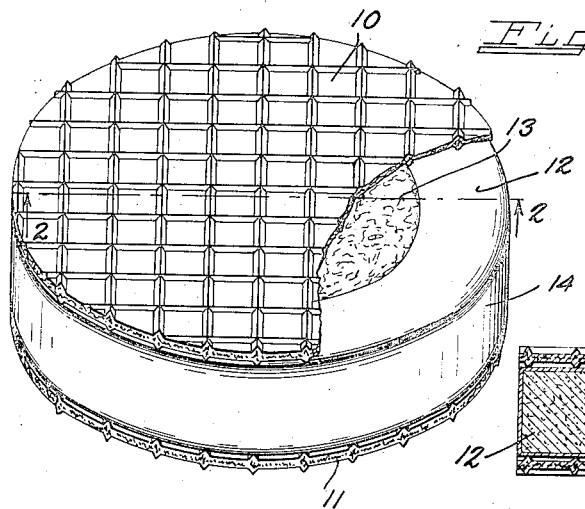
Fig. 1 is a perspective view, parts being broken away, illustrating the improved confection.
Figure 2:
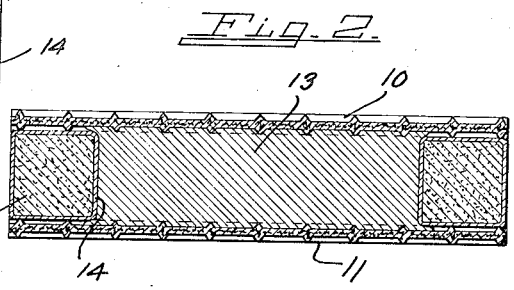
Fig. 2 is a sectional view taken substantially upon the line 2—2 upon Figure 1.
Figure 3:
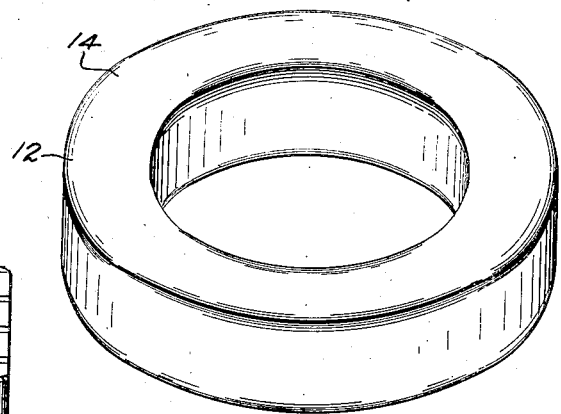
Fig. 3 is a perspective view of one element of the filling.

Referring to the accompanying drawing, wherein similar reference characters designate similar parts throughout, the improved confection comprises top and bottom wafers 10 and 11, these wafers being shown in Figure 1 as being circular in form. The wafers may be formed of any suitable self-sustaining baked pastry and may be corrugated so as to have a waffled appearance, as shown. Between the wafers there is a filling composed of two parts, the outer part indicated at 12 being in the form of an annular ring, the outer sides of which conform to the edges of the top and bottom wafers. Within this ring there is a central part of the filling indicated at 13. Preferably the outer part of the filling is a substance having a greater elasticity than the central part and I prefer to use an annular marshmallow, which may or may not be provided with a chocolate coating 14. When the marshmallow is chocolate coated, the coating makes the annular filling rigid and fairly strong. In this sense the annular coating is inelastic compared with soft ice cream but more elastic than the central filling 13 when the coating becomes cracked or broken during consumption. The central filling 13 may be ice cream or any other suitable substance. In marketing a confection of this character the retailer is supplied with the wafers and with the chocolate coated annular marshmallows. The ice cream is kept in a suitable refrigerator or ice cream cabinet. On supplying a customer, the marshmallow ring is positioned on the bottom wafer 11 and the center of the ring is filled with the ice cream 13, after which the top wafer 10 is applied. On squeezing the top and bottom wafers toward each other they will be caused to adhere to the top and bottom surfaces of the ice cream. I prefer to market the confection in this manner, wherein the elements of the confection are assembled upon delivery to the consumer, so that the top and bottom wafers will not absorb moisture from the ice cream and become soggy. When the confection is consumed the consumer on biting into the confection is not presented with the difficulty of having the ice cream center squeezed out between the edges of the wafers. The ice cream is effectively confined in place by the marshmallow ring.

Figure 4:
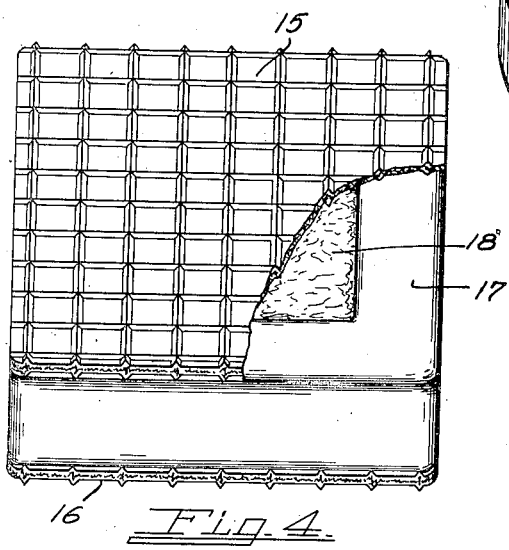
Fig. 4 is a perspective view illustrating a slightly modified form of construction.

It is not essential that the confection be circular in shape. On the contrary it may be given any desirable shape and to this end I have illustrated an alternative form in Figure 4 wherein the top and bottom wafers 15 and 16 are rectangular shape. The marshmallow or outside filling is given a rectangular shape, this filling being indicated at 17, and the square interior may be filled with ice cream indicated at 18.

From the above described constructions it will be appreciated that a novel confection has been provided which may be easily manufactured and distributed. The construction is such as to confine the ice cream or other soft filling in the center while the confection is being consumed.

Various changes may be made in the details of construction without departing from the spirit or scope of the invention as defined by the appended claims.

I claim:

1. A confection comprising top and bottom wafers, an annular ring of marshmallow between the wafers, and ice cream filling the center of the ring.

2. A confection comprising top and bottom wafers, a chocolate coated annular ring of marshmallow between the wafers, and ice cream filling the center of the ring.

3. A confection comprising top and bottom wafers, an annular ring of marshmallow between the wafers the outer sides of which conform to the outer sides of the wafers, and ice cream filling the center of the ring.

In testimony whereof I have signed my name to this specification.

PAUL W. CLARK.